(12) United States Patent
Jat

(10) Patent No.: US 11,350,289 B2
(45) Date of Patent: May 31, 2022

(54) IDENTIFICATION OF INDOOR AND OUTDOOR TRAFFIC USAGE OF CUSTOMERS OF A TELECOMMUNICATIONS NETWORK

(71) Applicant: T-Mobile USA, Inc., Bellevue, WA (US)

(72) Inventor: Khrum Kashan Jat, Sammamish, WA (US)

(73) Assignee: T-Mobile USA, Inc., Bellevue, WA (US)

(*) Notice: Subject to any disclaimer, the term of this patent is extended or adjusted under 35 U.S.C. 154(b) by 67 days.

(21) Appl. No.: 16/874,627

(22) Filed: May 14, 2020

(65) Prior Publication Data
US 2021/0360427 A1    Nov. 18, 2021

(51) Int. Cl.
| H04W 16/20 | (2009.01) |
| H04W 16/22 | (2009.01) |
| H04W 4/021 | (2018.01) |

(52) U.S. Cl.
CPC ........... *H04W 16/20* (2013.01); *H04W 4/021* (2013.01); *H04W 16/225* (2013.01)

(58) Field of Classification Search
CPC .... H04W 16/20; H04W 4/021; H04W 16/225
See application file for complete search history.

(56) References Cited

U.S. PATENT DOCUMENTS

| 6,262,980 B1 | 7/2001 | Leung et al. |
| 6,526,010 B1 | 2/2003 | Morioka et al. |
| 6,891,694 B2 | 5/2005 | Hetzler et al. |
| 6,973,312 B1 | 12/2005 | Ngan et al. |

(Continued)

FOREIGN PATENT DOCUMENTS

| KR | 20120089467 A | 8/2012 |
| KR | 20150021561 A | 3/2015 |
| KR | 20170076700 A | 7/2017 |

OTHER PUBLICATIONS

Ahas, R. et al. "Mobile Positioning in Space-Time Behaviour Studies: Social Positioning Method Experiments in Estonia" Cartography and Geographic Information Science vol. 34, No. 4, 2007, p. 259-273.

(Continued)

*Primary Examiner* — Dinh Nguyen
(74) *Attorney, Agent, or Firm* — Perkins Coie LLP

(57) ABSTRACT

Systems and methods to identify whether user traffic is generated indoors (e.g., from within a building) or outdoors for a variety of applications, including improving capacity planning, identifying new products offerings, troubleshooting/planning, competitive analysis, planning optimum locations of capacity planning solution deployment, traffic off-load analysis, etc. are disclosed. The method receives and aggregates data from a variety of sources, including customer geolocation data, network data, street/building maps, indoor/outdoor classification of traffic, etc. to generate demand density maps that depict network traffic usage patterns at a building level. The method can then use the demand density maps to identify hotspots, evaluate in-building coverage, and select and rank optimum solutions and/or locations for capacity improvement solutions deployment. As a result, a telecommunications service provider is able to efficiently and economically identify targeted solutions and locations to expand capacity of cell sites and improve customer experiences.

19 Claims, 11 Drawing Sheets

(56) References Cited

U.S. PATENT DOCUMENTS

| | | | |
|---|---|---|---|
| 7,038,993 B2 | 5/2006 | Minamino et al. |
| 7,142,874 B1 | 11/2006 | Oleniczak |
| 7,343,375 B1 | 3/2008 | Dulac |
| 7,539,111 B2 | 5/2009 | Ishida et al. |
| 7,539,919 B2 | 5/2009 | Hwang et al. |
| 7,680,495 B2 | 3/2010 | Abed et al. |
| 7,710,841 B2 | 5/2010 | Hwang et al. |
| 7,739,578 B2 | 6/2010 | Hwang et al. |
| 7,813,952 B2 | 10/2010 | Eskandari |
| 7,823,042 B2 | 10/2010 | Hwang et al. |
| 7,849,027 B2 | 12/2010 | Koran et al. |
| 7,898,921 B2 | 3/2011 | Ishida et al. |
| 7,929,459 B2 | 4/2011 | Silva et al. |
| 7,941,148 B2 | 5/2011 | Roskowski et al. |
| 7,945,837 B2 | 5/2011 | Hwang et al. |
| 7,957,993 B2 | 6/2011 | Macgregor |
| 7,966,233 B1 | 6/2011 | Khowash et al. |
| 7,987,122 B2 | 7/2011 | Bevente et al. |
| 8,060,079 B1 | 11/2011 | Goyal et al. |
| 8,060,602 B2 | 11/2011 | Singh et al. |
| 8,073,119 B2 | 12/2011 | Bevente et al. |
| 8,199,901 B2 | 6/2012 | Rani et al. |
| 8,270,979 B1 | 9/2012 | Vargantwar |
| 8,332,256 B2 | 12/2012 | Dey et al. |
| 8,429,270 B2 | 4/2013 | Singh et al. |
| 8,522,108 B2 | 8/2013 | Hwang et al. |
| 8,526,320 B2 | 9/2013 | Puthenpura et al. |
| 8,538,379 B1 | 9/2013 | Jessen et al. |
| 8,572,464 B2 | 10/2013 | Hwang et al. |
| 8,665,835 B2 | 3/2014 | Hussein et al. |
| 8,676,799 B1 | 3/2014 | Vaver |
| 8,694,018 B2 | 4/2014 | Budic et al. |
| 8,782,045 B1 | 7/2014 | Vaver |
| 8,782,216 B2 | 7/2014 | Raghavendran et al. |
| 8,861,691 B1 | 10/2014 | De et al. |
| 8,891,746 B2 | 11/2014 | Stachiw et al. |
| 8,914,372 B2 | 12/2014 | Cao et al. |
| 8,918,108 B2 | 12/2014 | Arad et al. |
| 8,918,397 B2 | 12/2014 | Cao et al. |
| 8,954,791 B2 | 2/2015 | Kataria et al. |
| 8,966,055 B2 | 2/2015 | Mittal et al. |
| 9,031,561 B2 | 5/2015 | Nuss et al. |
| 9,047,226 B2 | 6/2015 | Thomas et al. |
| 9,113,365 B2 | 8/2015 | Tang et al. |
| 9,154,550 B1 | 10/2015 | Abgrall et al. |
| 9,204,319 B2 | 12/2015 | Ouyang et al. |
| 9,226,178 B2 | 12/2015 | Tarraf et al. |
| 9,253,334 B1 | 2/2016 | Rai et al. |
| 9,264,932 B2 | 2/2016 | Chen et al. |
| 9,332,458 B2 | 5/2016 | Nuss et al. |
| 9,411,653 B2 | 8/2016 | Trammel et al. |
| 9,413,890 B2 | 8/2016 | Mccormack et al. |
| 9,424,121 B2 | 8/2016 | Kushnir et al. |
| 9,430,944 B2 | 8/2016 | Grimm et al. |
| 9,437,081 B2 | 9/2016 | Hoffman et al. |
| 9,439,081 B1 | 9/2016 | Knebl et al. |
| 9,456,362 B2 | 9/2016 | Flanagan et al. |
| 9,479,981 B2 | 10/2016 | Dimou et al. |
| 9,491,285 B2 | 11/2016 | Vaderna et al. |
| 9,503,919 B2 | 11/2016 | Sofuoglu et al. |
| 9,563,491 B2 | 2/2017 | Scouller et al. |
| 9,628,363 B2 | 4/2017 | Singh et al. |
| 9,674,374 B1 | 6/2017 | Bolton et al. |
| 9,706,438 B1 | 7/2017 | Kadmon et al. |
| 9,712,295 B2 | 7/2017 | Park et al. |
| 9,753,477 B2 | 9/2017 | Berka et al. |
| 9,826,412 B2 | 11/2017 | Henderson et al. |
| 9,826,420 B2 | 11/2017 | Tarraf et al. |
| 9,867,080 B2 | 1/2018 | Sung et al. |
| 9,892,026 B2 | 2/2018 | Isman et al. |
| 9,894,215 B1 | 2/2018 | Bolton et al. |
| 9,924,045 B1 | 3/2018 | Guha et al. |
| 10,039,013 B2 | 7/2018 | Periyasamy et al. |
| 10,044,878 B2 | 8/2018 | Guha et al. |
| 10,050,844 B2 | 8/2018 | Flanagan et al. |
| 10,079,735 B2 | 9/2018 | Martone et al. |
| 10,091,679 B1 | 10/2018 | Munar et al. |
| 10,159,111 B2 | 12/2018 | De Pasquale et al. |
| 10,231,147 B2 | 3/2019 | Sung et al. |
| 10,555,191 B1 | 2/2020 | Jat et al. |
| 11,064,382 B1 | 7/2021 | Jat |
| 2003/0171976 A1 | 9/2003 | Farnes et al. |
| 2006/0064346 A1 | 3/2006 | Steenstra et al. |
| 2006/0167777 A1 | 7/2006 | Shkedy |
| 2007/0156673 A1 | 7/2007 | Maga et al. |
| 2010/0041408 A1 | 2/2010 | Caire et al. |
| 2012/0190380 A1 | 7/2012 | Dupray et al. |
| 2012/0244869 A1 | 9/2012 | Song et al. |
| 2012/0244898 A1 | 9/2012 | Guey et al. |
| 2013/0095872 A1 | 4/2013 | Sediq et al. |
| 2013/0229914 A1 | 9/2013 | Suerbaum |
| 2013/0331109 A1 | 12/2013 | Dhillon et al. |
| 2014/0278035 A1 | 9/2014 | Nortrup |
| 2016/0125456 A1 | 5/2016 | Wu et al. |
| 2016/0381580 A1 | 12/2016 | Kwan |
| 2017/0243484 A1 | 8/2017 | Li et al. |
| 2017/0272319 A1 | 9/2017 | Sheen et al. |
| 2018/0006957 A1 | 1/2018 | Ouyang et al. |
| 2018/0184307 A1 | 6/2018 | Periyasamy et al. |
| 2019/0141580 A1 | 5/2019 | Oktay et al. |
| 2019/0159048 A1 | 5/2019 | Feldkamp |
| 2019/0208438 A1 | 7/2019 | Yang et al. |
| 2019/0239238 A1 | 8/2019 | Calabrese et al. |
| 2020/0076520 A1 | 3/2020 | Jana et al. |
| 2020/0314683 A1 | 10/2020 | Imran et al. |
| 2020/0322814 A1 | 10/2020 | Tofighbakhsh et al. |
| 2021/0014698 A1 | 1/2021 | Meier-Hellstern et al. |
| 2021/0037394 A1 | 2/2021 | Wainer et al. |
| 2021/0037399 A1 | 2/2021 | Jat et al. |
| 2021/0049656 A1 | 2/2021 | Jat et al. |

OTHER PUBLICATIONS

Bi, Suzhi et al. "Engineering Radio Maps for Wireless Resource Management" IEEE Wireless Communications, Apr. 2019, p. 133-141.

de Reuver, M. et al. "Designing viable business models for context-aware mobile services" Elsevier Telematics and Informatics 26 (2009) p. 240-248.

Lee, Seung-Cheol et al. "Efficient Mining of User Behaviors by Temporal Mobile Access Patterns" International Journal Computer Science and Network Security, vol. 7, No. 2, Feb. 2007, p. 285-291.

Ratti, C. et al. "Mobile Landscapes: using location data from cell phones for urban analysis" Environment and Planning B: Planning and Design 2006, vol. 33, p. 727-748.

Roth, John D. et al. "Efficient System Geolocation Architecture in Next-Generation Cellular Networks" IEEE Systems Journal, vol. 12, No. 4, Dec. 2018, p. 3414-3425.

Tseng, V. S. et al. "Mining Temporal Mobile Sequential Patterns in Location-Based Service Environments" IEEE International Conference 2007, 8 pages.

European Patent Office, Extended European Search Report, EP Patent Application 21172462, dated Sep. 23, 2021, 13 pages.

Kuruvatti, Nandish P. et al. "Monitoring Vehicular User Mobility to Predict Traffic Status and Manage Radio Resources," 2017 IEEE 85th Vehicular Technology Conference (VTC Spring), IEEE, Jun. 4, 2017, 6 pages.

Shabir, Balawal et al. "Congestion Avoidance in Vehicular Networks: A Contemporary Survey," IEEE Access vol. 7, Nov. 27, 2019, 20 pages.

| Building | CELL_NAME | DL_INBUILDING_MB | DL_SECTOR_MB | UL_INBUILDING_MB | UL_SECTOR_MB | AVG_RSRP | Sub_count | MarketName |
|---|---|---|---|---|---|---|---|---|
| New York New York Hotel and Casino | xxxxxxB | 1,383,969 | 594,835,142.093 | 473,801 | 74,898,421,169 | -89.75 | 1 | Las Vegas |
| New York State Pavilion | xxxxxxC | 4,489,223 | 31,078,079,613 | 688,053 | 5,707,834,110 | -101.62 | 11 | New York |
| New York City Center | xxxxxxF | 630,425 | 144,870,188,567 | 728,967 | 30,022,766,802 | -101.43 | 2 | New York |
| New York New York Hotel and Casino | xxxxxxG | 278,703 | 116,495,306,406 | 47,355 | 15,066,470,684 | -99.9 | 6 | Las Vegas |

*FIG. 6*

IDENTIFICATION OF INDOOR AND OUTDOOR TRAFFIC USAGE OF CUSTOMERS OF A TELECOMMUNICATIONS NETWORK

CROSS-REFERENCE TO RELATED APPLICATIONS

This application incorporates by reference U.S. application Ser. No. 16/869,530, filed May 7, 2020, entitled MANAGEMENT OF TELECOMMUNICATIONS NETWORK CONGESTION ON ROADWAYS.

BACKGROUND

A telecommunications network is established via a complex arrangement and configuration of many cell sites that are deployed across a geographical area. For example, there can be different types of cell sites (e.g., macro cells, microcells, and so on) positioned in a specific geographical location, such as a city, neighborhood, and so on). These cell sites strive to provide adequate, reliable coverage for mobile devices (e.g., smart phones, tablets, and so on) via different frequency bands and radio networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), or other communications networks. The devices can seek access to the telecommunications network for various services provided by the network, such as services that facilitate the transmission of data over the network and/or provide content to the devices.

As device usage continues to rise at an impressive rate, there are too many people using too many network (and/or data)-hungry applications in places where the wireless edge of the telecommunications network has limited or no capacity. As a result, most telecommunications networks have to contend with issues of network congestion. Network congestion is the reduced quality of service that occurs when a network node carries more data than it can handle. Typical effects include queueing delay, packet loss or the blocking of new connections, overall resulting in degraded customer experience.

BRIEF DESCRIPTION OF THE DRAWINGS

FIG. 6 shows an example of a data table showing total data for a building after classification.

Figure 1:
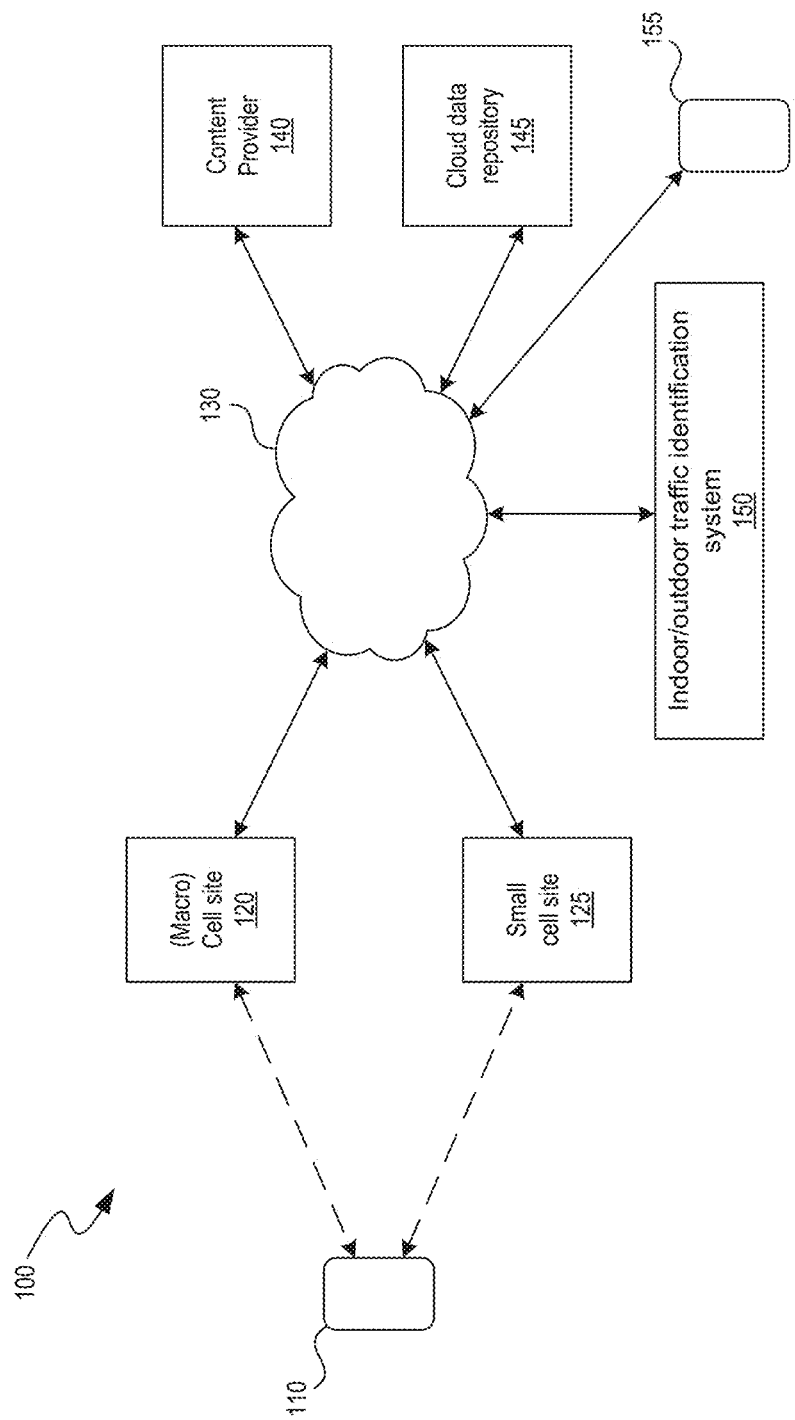
FIG. 1 is a block diagram illustrating a suitable computing environment within which to identify indoor/outdoor telecommunications network traffic.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the specific implementations described. On the contrary, the technology is intended to cover all modifications, equivalents, and alternatives falling within the scope of the technology as defined by the appended claims.

DETAILED DESCRIPTION

An aim of a telecommunications service provider is to minimize customer experience degradation. This is typically achieved by deploying congestion management and/or network improvement solutions at one or more cell sites. To combat network congestion, different capacity planning solutions have been suggested to address and resolve the degradation issues. Further, depending on whether a location is indoors or outdoors, different network capacity solutions may be applicable to enhance network capacity. For example, for a building with high network usage traffic, it can be beneficial to deploy microcells on specific building floors to ease network traffic congestion in that building. But, it is currently difficult to identify whether network usage traffic is being generated indoors or outdoors, especially in high density areas, such as downtowns. As a result, the process for identifying which network capacity solutions to deploy to alleviate network congestion and/or improve capacity is more of a trial and error process. And it can also be difficult to predict traffic offload forecast. For example, it is difficult to determine/identify locations for hotspot solutions to alleviate network congestion. This results in inefficiencies as well as wasted costs as telecommunications service providers try (and fail) deploying sub-optimum network capacity solutions that are not tailored to the indoor or outdoor location of network traffic usage.

To solve these and other problems, the inventors have developed systems and methods to identify whether user traffic is generated indoors (e.g., from within a building) or outdoors for a variety of applications, including improving capacity planning, identifying new products offerings, troubleshooting/planning, competitive analysis, planning optimum locations of capacity planning solution deployment, traffic offload analysis, etc. The method receives and aggregates data from a variety of sources, including customer geolocation data, network data, street/building maps, indoor/outdoor classification of traffic, etc. to generate demand density maps that depict network traffic usage patterns at a building level. The method can then use the demand density maps to identify hotspots, evaluate in-building coverage, and select and rank optimum solutions and/or locations for capacity improvement solutions deployment. As a result, a telecommunications service provider is able to efficiently and economically identify targeted solutions and locations to expand capacity of cell sites and improve customer experiences. (While the term "customer" is used in the application, one of skill in the art will understand that the concepts discussed herein will similarly apply to other users, who may or may not be customers of a telecommunications service provider.)

In the following description, for the purposes of explanation, numerous specific details are set forth in order to provide a thorough understanding of implementations of the present technology. It will be apparent, however, to one skilled in the art that implementations of the present technology can be practiced without some of these specific details.

The phrases "in some implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Suitable Computing Environments

FIG. 1 is a block diagram illustrating a suitable computing environment within which to manage telecommunications network congestion on roadways.

One or more user devices 110, such as mobile devices or user equipment (UE) associated with users (such as mobile phones (e.g., smartphones), tablet computers, laptops, and so on), Internet of Things (IoT) devices, devices with sensors, and so on, receive and transmit data, stream content, and/or perform other communications or receive services over a telecommunications network 130, which is accessed by the user device 110 over one or more cell sites 120, 125. For example, the mobile device 110 can access a telecommunication network 130 via a cell site at a geographical location that includes the cell site, in order to transmit and receive data (e.g., stream or upload multimedia content) from various entities, such as a content provider 140, cloud data repository 145, and/or other user devices 155 on the network 130 and via the cell site 120.

The cell sites can include macro cell sites 120, such as base stations, small cell sites 125, such as picocells, microcells, or femtocells, and/or other network access component or sites. The cell cites 120, 125 can store data associated with their operations, including data associated with the number and types of connected users, data associated with the provision and/or utilization of a spectrum, radio band, frequency channel, and so on, provided by the cell sites 120, 125, and so on. The cell sites 120, 125 can monitor their use, such as the provisioning or utilization of physical resource blocks (PRBs) provided by a cell site physical layer in LTE network; likewise the cell sites can measure channel quality, such as via channel quality indicator (CQI) values, etc.

Other components provided by the telecommunications network 130 can monitor and/or measure the operations and transmission characteristics of the cell sites 120, 125 and other network access components. For example, the telecommunications network 130 can provide a network monitoring system, via a network resource controller (NRC) or network performance and monitoring controller, or other network control component, in order to measure and/or obtain the data associated with the utilization of cell sites 120, 125 when data is transmitted within a telecommunications network.

In some implementations, the computing environment 100 includes a indoor/outdoor traffic identification system 150 configured to monitor aspects of the network 130 based on, for example, data received from the network monitoring system. The indoor/outdoor traffic identification system 150 can receive customer usage data, geospatial data, location data (e.g., latitude/longitude), map data (e.g., depicting streets/buildings), building data (e.g., building type, wall thickness, signal attenuation, building configuration/layout, etc.), and network data to determine where and when congestion happens in a geographic area (e.g., in a city), whether the congestion is occurring indoors (e.g., inside buildings), and/or during which time(s) of day.

FIG. 1 and the discussion herein provide a brief, general description of a suitable computing environment 100 in which the indoor/outdoor traffic identification system 150 can be supported and implemented. Although not required, aspects of the indoor/outdoor traffic identification system 150 are described in the general context of computer-executable instructions, such as routines executed by a computer, e.g., mobile device, a server computer, or personal computer. The system can be practiced with other communications, data processing, or computer system configurations, including: Internet appliances, hand-held devices (including tablet computers and/or personal digital assistants (PDAs)), Internet of Things (IoT) devices, all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network, such as a Local Area Network (LAN), Wide Area Network (WAN), or the Internet. In a distributed computing environment, program modules can be located in both local and remote memory storage devices.

Aspects of the system can be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In alternative implementations, the mobile device or portable device can represent the server portion, while the server can represent the client portion.

In some implementations, the user device 110 and/or the cell sites 120, 125 can include network communication components that enable the devices to communicate with remote servers or other portable electronic devices by transmitting and receiving wireless signals using a licensed, semi-licensed, or unlicensed spectrum over communications network, such as network 130. In some cases, the communication network 130 can be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The telecommunications network 130 can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), or other communications networks. Thus, the user device is configured to operate and switch among multiple frequency bands for receiving and/or transmitting data.

Further details regarding the operation and implementation of the indoor/outdoor traffic identification system 150 will now be described.

Examples of Identifying Indoor/Outdoor Network Traffic

Figure 2:
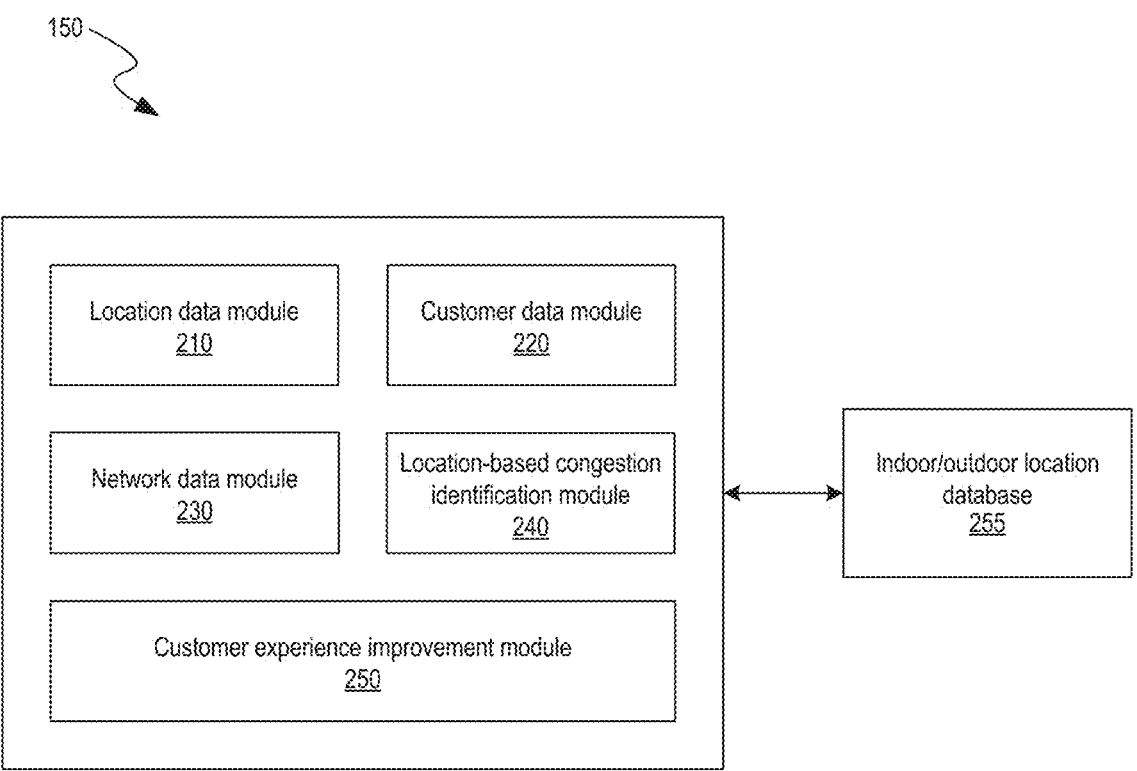
FIG. 2 is a block diagram illustrating the components of the indoor/outdoor traffic identification system.

FIG. 2 is a block diagram illustrating the components of the indoor/outdoor traffic identification system 150. The indoor/outdoor traffic identification system 150 can include functional modules that are implemented with a combination of software (e.g., executable instructions, or computer code) and hardware (e.g., at least a memory and processor). Accordingly, as used herein, in some examples a module is a processor-implemented module or set of code, and represents a computing device having a processor that is at least temporarily configured and/or programmed by executable instructions stored in memory to perform one or more of the specific functions described herein. For example, the indoor/outdoor traffic identification system 150 can include a location data module 210, a customer data module 220, a network data module 230, a location-based congestion identification module 240, and a customer experience improvement module 250, each of which is discussed separately below.

Location Data Module

The location data module 210 is configured and/or programmed to receive location related data (e.g., geospatial data). For example, the location data module 210 collects/receives/accesses one or more of the following location related records, such as map data (e.g., depicting streets/buildings), building map, building location (e.g., latitude/longitude), building shape, building span (e.g., size of building—length, width, height), building type, wall thickness, signal attenuation, building configuration/layout, building floors, indoor/outdoor classification of traffic, signal attenuation, customer's proximate location in building (e.g., floor number, proximity to windows, etc.), and so on. One or more location data records can be associated with a timestamp to indicate that the data values correspond to the particular date/time.

The location records can be received from multiple sources and can be used to determine or classify whether a particular location (e.g., using latitude and longitude) is indoors or outdoors. For example, the location data module 210 can receive location records and/or location classification information (e.g., whether a location is indoors/outdoors) from one or more of the following sources: customer selection, APIs, applications on customer devices, sensor data from customer devices (IoT, home broadband, femto-cells), third party applications (e.g., OpenStreetMap®, Google Maps®, etc.), and so on. In some implementations, when a customer uses a telecommunications network provider service (e.g., makes a call, opens a browser/application, etc.), the customer can select whether he/she is indoors/outdoors. The customer selection data can be collected for a period of time and then be used to train machine learning models (e.g., decision trees, neural networks, etc.) to predict whether customer traffic is generated indoors/outdoors. Additionally or alternatively, one or more sensors on a customer's devices (IoT/broadband/Femto/Micro/Pico-Cells) can collect network data, which can then be used in conjunction with the customer's location data (e.g., latitude/longitude) to determine/classify whether the customer is indoors/outdoors when a network data record was generated. For example, data from temperature and/or humidity sensors (IoT) (which measure ambient temperature and/or humidity) from a customer's device can be used to determine that the customer is indoors/inside a building (e.g., when the measured temperature is lower than the expected outdoors temperature, etc.) As most of the IoT/broadband modem/Femto/Micro/PicoCells) installed inside and measurement from them help to train the model for the whole traffic.

In some implementations, a third party application (e.g., OpenStreetMap®) in conjunction with a customer's location (e.g., latitude/longitude) can be used to perform a special join (e.g., geospatial matches) to determine whether the customer's location is indoors/outdoors. As another example, a third-party API (e.g., Google® API) can be used to determine whether a customer's location is indoors/outdoors. Additionally, or alternatively, the distance between a customer's device and one or more cell sites can also be used to determine the location (indoors/outdoors) of the customer.

The location data module 210 can reconcile the location data classification (i.e., whether a location is indoors/outdoors), which is received from the various sources discussed above, to determine an aggregate location data classification for the location. For example, location data classification from two or more sources can be given an equal vote to determine whether location is indoors/outdoors. When a majority of the solutions determine that the location is indoors, then the aggregate location classification is determined to be indoors. Alternatively or additionally, the sources can be assigned weights (e.g., based on one or more factors, such as their accuracy, reliability, freshness, etc.), which are then used to compute an weighted aggregate location classification for a location.

Figure 5:
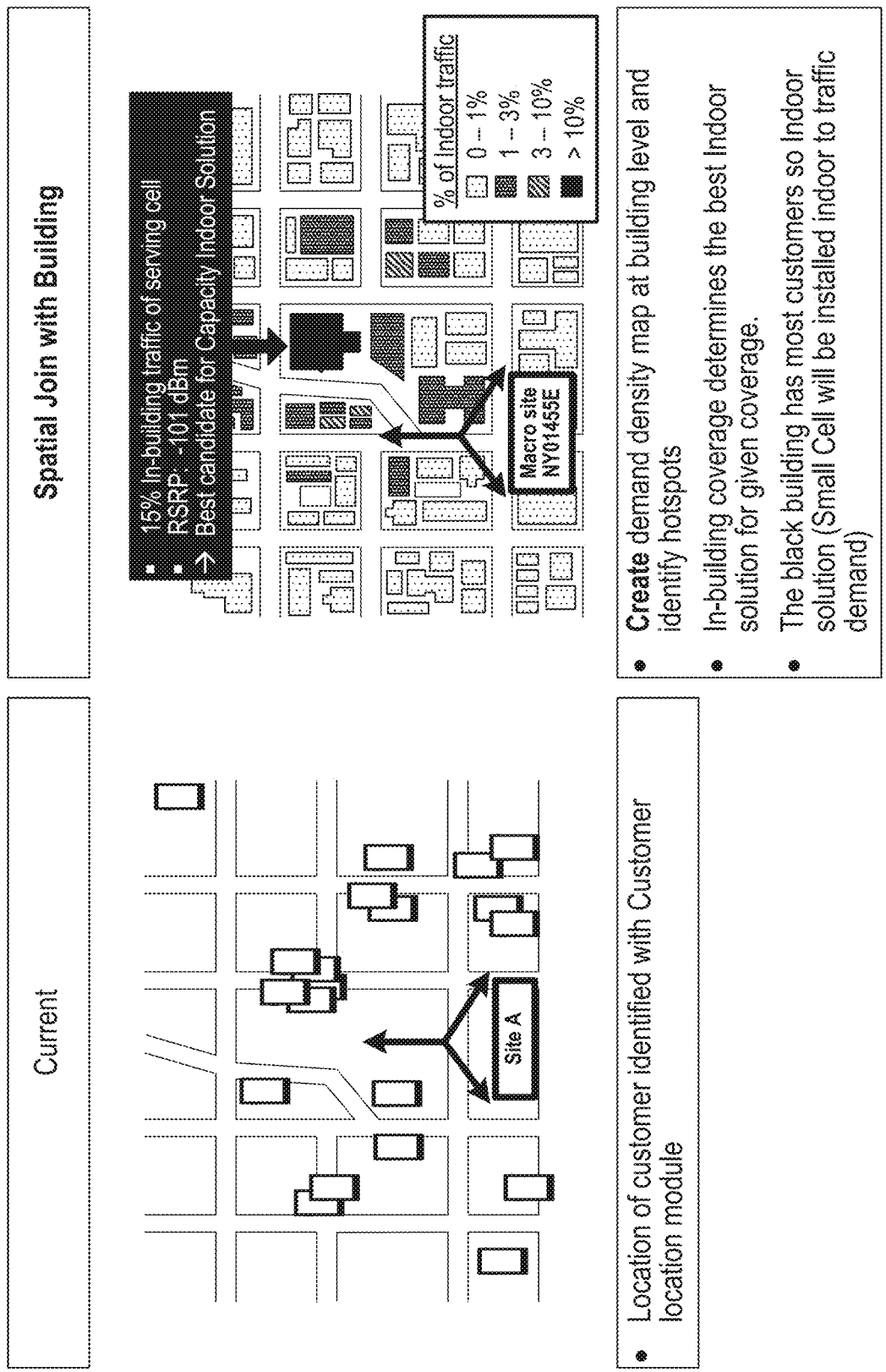
FIG. 5 shows a comparison between existing customer location versus spatially aggregating or joining customers within a building polygon.

FIG. 5 shows on the left that locations of customers previously was identified simply based on location data of individual mobile devices, without any joining our aggregation. However, as shown on the right, employing spatial joining within a building, traffic clustered within a building can be identified. As shown and explained herein, the present system creates demand density maps at a building level to identify hotspots. In-building coverage allows the system to determine an optimal indoor coverage solution to improve customer experience. As shown in the diagram to the right, the black building has greater than 10% of the indoor traffic for the location displayed on the map, and thus identifies the best candidate for a carrier, building or user to employ a solution to increase indoor capacity.

Customer Data Module

The customer data module 220 is configured and/or programmed to receive a customer's data when accessing services/utilities associated with a telecommunications network. For example, the customer data module 220 collects/receives/accesses one or more of the following customer data records associated with a customer relating to the following types of information (which can be stored in the Indoor/outdoor location database 255): location specific records (LSR), call data records (CDRs), timing advance values, RF signal data (e.g., e.g., Reference Signal Received Power (RSRP) data, Reference Signal Received Quality (RSRQ) data), speed, experience throughputs, reported coverage, distance between the customer and at least one telecommunications network site, strength of signal, quantity of data used, type of device of the customer, applications data (e.g., application type, name, owner, manager, data sent/received/used/saved, bandwidth used, APIs accessed, etc.), source of customer records (for example, telecommunications service provider, third-party, application owner, etc.). Examples of other types of data collected by the customer data module include, but are not limited to, data collected from third party applications (e.g., including crowdsourced data) that can help to determine customer experience with location. For example, the customer data module can collect information of a user's location using his/her social media posts (e.g., tweets, check-ins, posts, etc.). As another example, the customer data module collects application level data (e.g., collected using applications related to Internet of Things (IoT) devices, sensors, billing meters, traffic lights, etc.) to identify the user location and applications used to enhance the location algorithm. The in-customer data records associated with the customer can comprise information about an associated customer location and an associated timestamp. For example, a call data record for a customer can identify a customer location and a timestamp when the call was initiated. The customer data module can collect customer records that span a particular period of time depending on, for example, density of customer records, customer activity, types of customer records (for example, text, voice, video, app-usage, emergency services, etc.), services/products to be offered to the customer, types of customer experience enhancement solutions/actions to be implemented, source of customer records, and so on. In some implementations, the location and timestamp information can be determined using data gathered/generated by applications on a customer's mobile device (e.g., Spotify®, Pandora®, Facebook®, Twitter®, email applications, and so on). Other sources of information include call/charge detail record (CDR), LSR, Social Media APIs, IoT devices are sources of customer data information.

Network Data Module

The network data module 230 is configured and/or programmed to receive network data, such as timing advance values, site coverage/RF signal data (e.g., Reference Signal Received Power (RSRP) data, Reference Signal Received Quality (RSRQ) data), channel quality indicator (CQI) values, capacity on site (configured bandwidth, used bandwidth, etc.), number of users, and so on. Other types/attributes of customer information that could be collected and/or would be useful can be from network data indicating how much data was transferred with low MCS (Modulation Coding and Scheduling). If most data transfer is through the lower MCS, this can mean that a customer is indoor or on the cell edge which also help to model the indoor and outdoor traffic.

Location-Based Congestion Identification Module

The location-based congestion identification module 240 is configured and/or programmed to determine, based on customer data, network data, and/or location data, indoor network traffic congestion (e.g., within buildings in a city area). Determining indoor network traffic congestion can aid with network troubleshooting/planning, performing competitive analysis, plan optimum location for deploying one or more customer experience enhancement actions, perform traffic offload analysis, network demand (traffic and customer located in each building), and so on (discussed in more detail below).

Various metrics and mechanisms can be used to identify congestion at a location. For example, U.S. Pat. No. 10,524,158, the contents of which are incorporated herein in their entirety, describe systems and methods for identifying congestion at a cell site. For example, the location-based congestion identification module 240 computes aggregate congestion values that for the following metrics: traffic, signal strength (e.g., RF signal-RSRP), download speed, PRB (Physical resource block), total number of users in that location, and so on. After determining congestion at various locations using the customer data and/or network data, the location-based congestion identification module 240 can perform a special join of the congestion determination data with the location data to determine whether the congestion is indoors or outdoors.

FIG. 6 shows an example use case that shows a snapshot of the customer data and location data, and how it is joined to produce indoors/outdoors congestion information. As shown, certain buildings are listed and identified by a cell name (CELL_NAME), and have traffic data associated therewith, such as megabytes of downlink and uplink in-building traffic (DL_INBUILDING_MB, UL_INBUILDING_MB), downlink and uplink traffic by cell sector (DL_SECTOR_MB, UL_SECTOR_MB), average reference signals received power (AVG_RSRP), sub count and market name. In this manner, the location-based congestion identification module 240 can identify congested buildings in a city. For example, when one or more aggregate congestion values for a building are outside of threshold bound ranges, then the building is classified as congested.

Figure 4A:
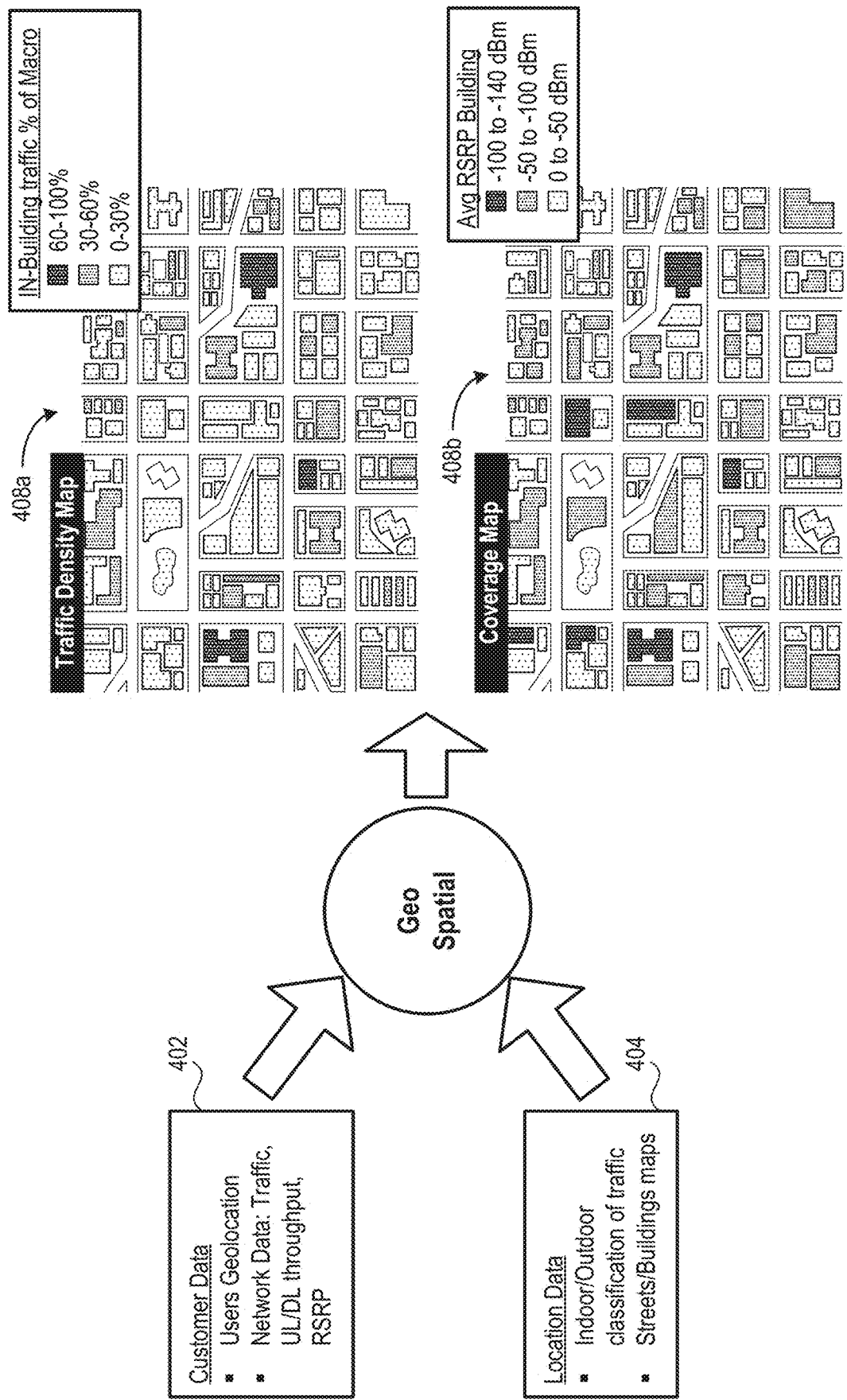
FIGS. 4A-4F are example diagrams illustrating demand density maps generated for identifying indoor/outdoor telecommunications network traffic.

FIG. 4A illustrates an example of geospatially combining customer and/or network data 402 and location data 404 to generate demand density maps 408a and 408b depicting congestion metric values at a building level. Demand density map 408a depicts various buildings in a geographic area, each of which is visually marked to indicate the aggregate amount of in-building traffic in the building. Similarly, demand density map 408b depicts various buildings in a geographic area, each of which is visually marked to indicate the aggregate amount of in-building RF signal data (RSRP) in the building.

The location-based congestion identification module 240 collects customer data and/or network data for multiple customers over a period of time (e.g., a day, week, month, quarter, yearly, etc.). In some implementations, the location-based congestion identification module 240 performs outlier analysis on the customer data, location data, and/or network data before using that information to determine indoor network traffic congestion. In some implementations, the location-based congestion identification module 240 can determine indoor network traffic congestion information for multiple buildings (e.g., all buildings in a downtown area of a city), which can then be used to forecast future congestion in those buildings, similar buildings, and so on. For example, the information generated by location-based congestion identification module 240 can be combined with data from other sources (such as network data, user application (e.g., Pandora®, Spotify®, etc.), speed testing applications (e.g., Ookla®), etc. to understand, learn, and forecast customer experience at a location. One or more of the following data points can be used to forecast customer experience: customer handset type, throughput, RSRP, hour of the day, location (latitude/longitude), distance from sites, capacity on site, CQI, traffic per site, Physical Resource Block (PRB), bandwidth, and so on. The location-based congestion identification module 240 can use a model (e.g., decision trees) trained on these data point values to determine indoors/outdoors location and/or congestion for new customer data.

Customer Experience Improvement Module

The customer experience improvement module 250 is configured and/or programmed to identify at least one customer experience enhancement action. The customer experience enhancement actions are intended to enhance overall customer experience based upon the determined indoor network traffic congestion. After identifying congested buildings (e.g., buildings having an aggregate congestion metric value that is greater than a threshold amount), the customer experience improvement module 250 identifies the site(s) supporting the congested buildings as potential sites where customer experience enhancement actions can be deployed to reduce congestion and improve customer experience. By identifying whether congestion is occurring indoors versus outdoors, the customer experience improvement module 250 is able to identify and select customer experience enhancement actions that are more targeted to solving the congestion problems, thus optimizing solution deployment time, cost, and/or effort. For example, instead of identifying a sector-add customer experience enhancement action for a congested site (which is both costly and takes more time to deploy), the customer experience improvement module 250 offers a small cell customer experience enhancement action for the congested site (which is cheaper and faster to deploy than the sector-add solution) because most of the congestion is occurring indoors. Other examples of how the present system can identify targeted congestion management solutions include indoor congestion management, such as for DAS (Distributed Antenna Systems), Small Cells (1 km range), Femto Cells (400 m range), Micro/Pico Cells (100 m).

In some implementations, the customer experience enhancement actions are identified based on a level of service subscribed to by the customer (e.g., basic service, premium service, etc.), customer's payment history, customer location, time of day, promotions, coverage service level, and so on. Examples of customer experience enhancement action include, but are not limited to: adding spectrum to sites, removing spectrum from sites, adding cell site proximate to the sites, removing cell site(s), displacing cell site(s), adding or enhancing at least one technology capability for a site, implementing a cell split, deploying a small cell, adding/removing a sector, enhancing sector capacity, adding/removing a cell on wheels, adding/removing a tower, adding/removing hot spots, modifying capacity at the identified at least one site, and so on. Additionally or alternatively, the customer experience enhancement action comprises providing one or more of the following services to the customer (free or at reduced rates for a period of time): gaming, home security, music, videos, advertising, offers, rebates, location intelligence, upsales, partnerships with other companies, special content. For example, based on a customer's location (indoor/outdoor), the customer experience improvement module identifies offers for services such as, 4K video streaming services, gaming services, and so on.

Figure 4B:
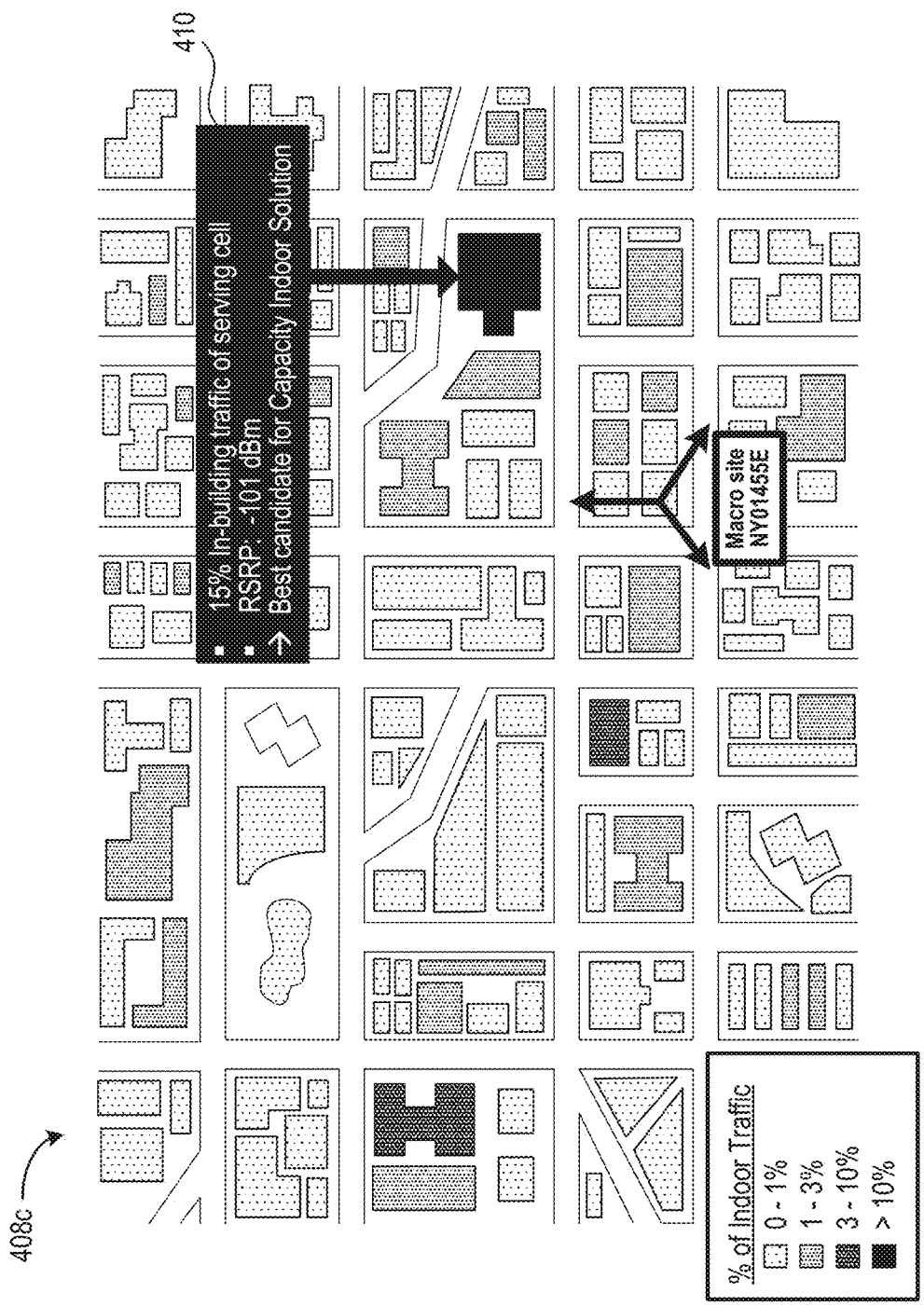
Figure 4C:
Figure 4D:
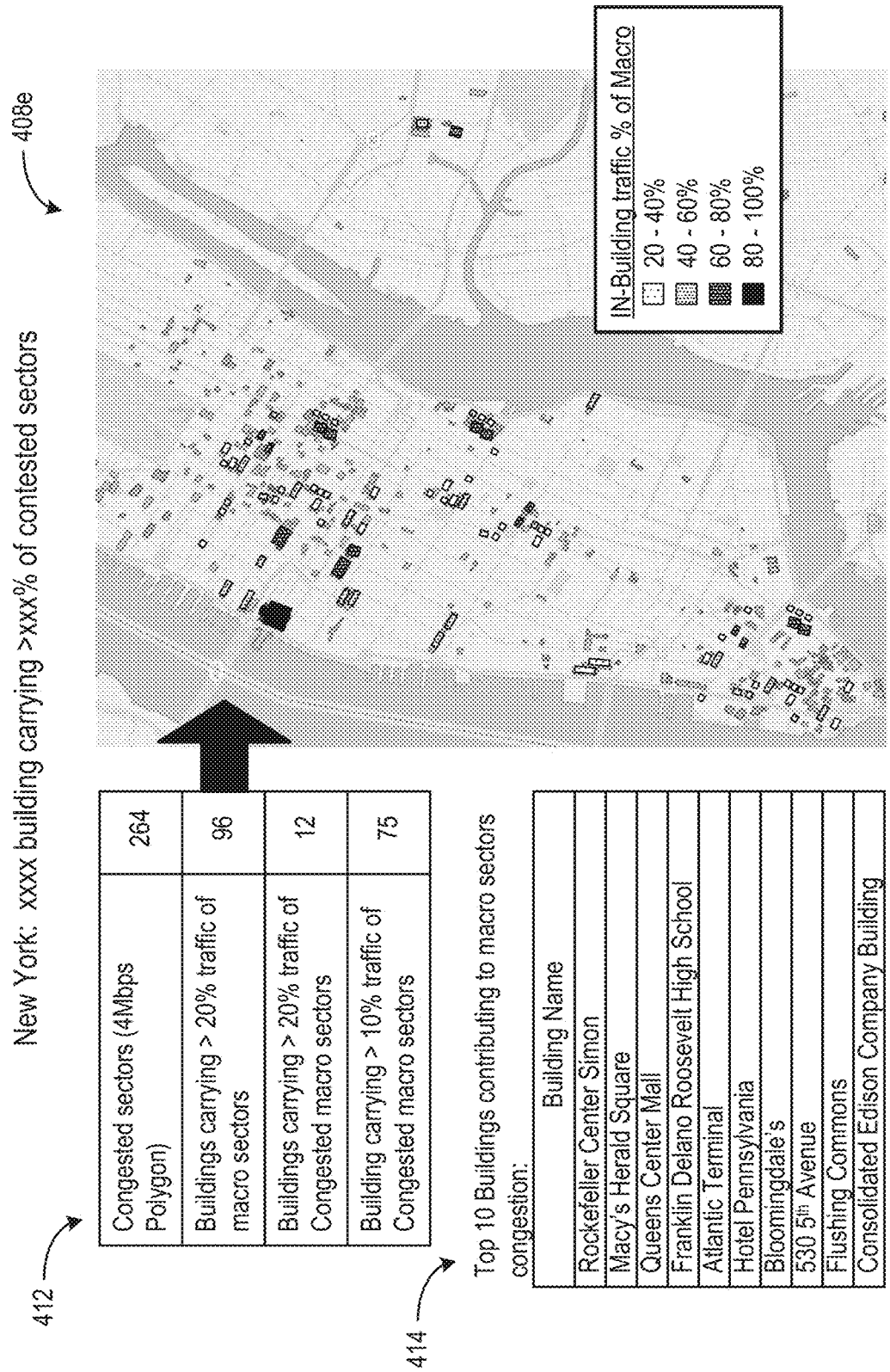

The customer experience improvement module 250 can further present a demand density map to customers that depicts various aggregate congestion metric values for buildings. For example, as illustrated in FIG. 4B, a demand density map 408c can be displayed. The demand density map 408c depicts percentage of indoor traffic for buildings in a city portion. The buildings can be visually graded (and/or color coded) to depict the amount of traffic in each building. A user can select a building (e.g., by hovering over it, clicking it, and so on) to view details 410, such as the amount of traffic, signal strength, whether the building is a candidate for deploying customer experience enhancement actions, which customer experience enhancement actions to deploy, and so on). Similarly, FIG. 4C illustrates a density map 408d that depicts in-building traffic for various areas in a city (e.g., New York City). A user can select a city portion (e.g., by zooming-in) to view additional details for the selected portion. For example, as illustrated in FIG. 4D, a user can view, for the Financial District in New York City, additional details, such as congested sector and building-level details 412, the top 10 buildings contributing to sector congestion 414, and the demand density map 408e.

Figure 4E:
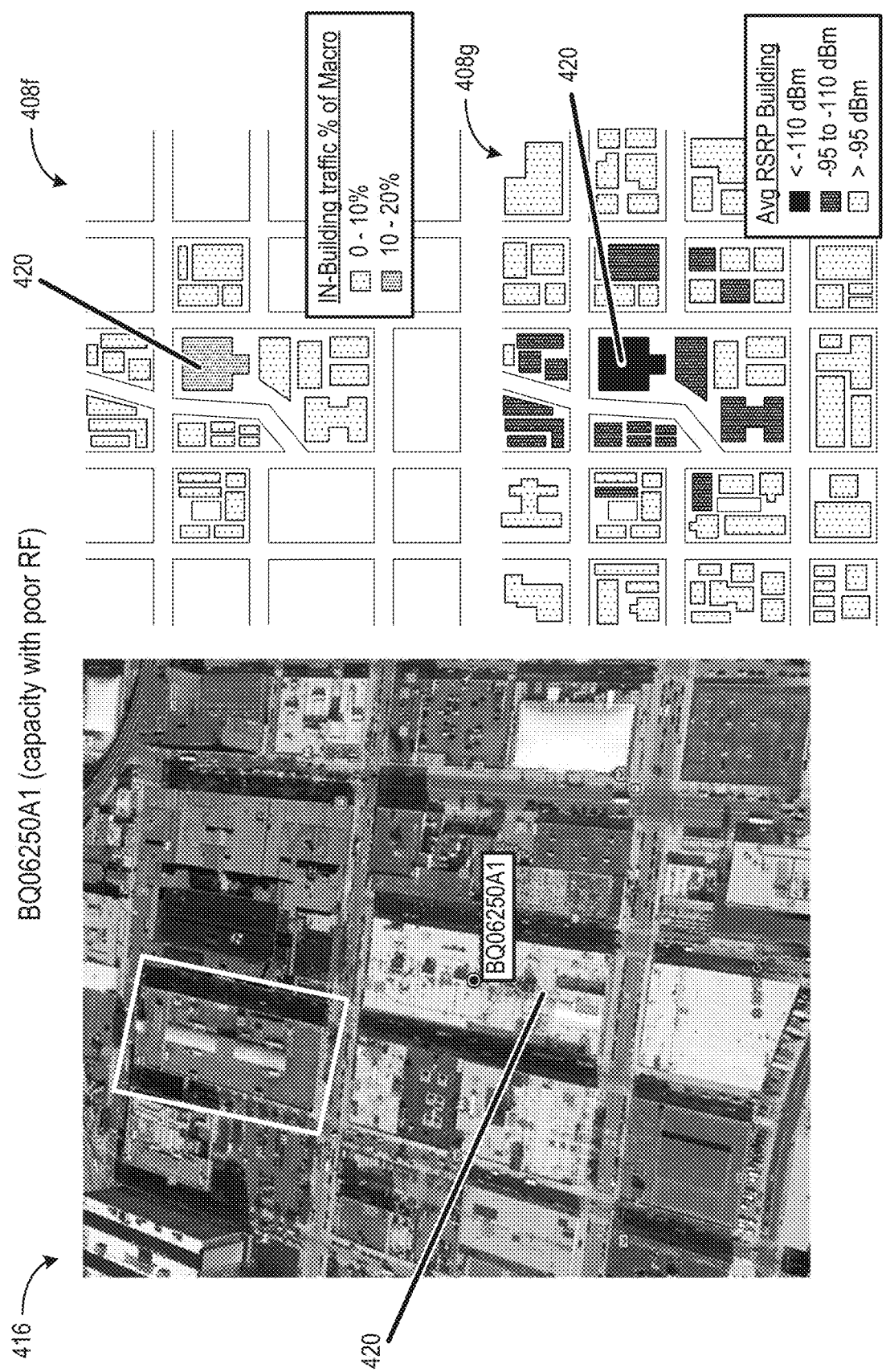

In some implementations, the customer experience improvement module 250 can identify, select, and/or rank customer experience enhancement actions using values for multiple aggregate congestion metrics (e.g., both traffic and signal strength). For example, as illustrated in FIG. 4E, the customer experience improvement module 250 displays two demand density maps 408f and 408g for the same set of buildings 416, each of which display congestion metric values for traffic and signal strength, respectively. The customer experience improvement module 250 can further determine, based on this congestion metrics information, that building 420 has both high traffic and low signal strength. The customer experience improvement module 250 can then identify building 420 as a potential candidate where customer experience enhancement actions should be deployed. The customer experience improvement module 250 can further select and/or rank the available customer experience enhancement actions to be deployed at building 420 based on factors, such as building location, building type, wall thickness, signal attenuation, building configuration/layout, other nearby deployed solutions, and so on.

Figure 4F:
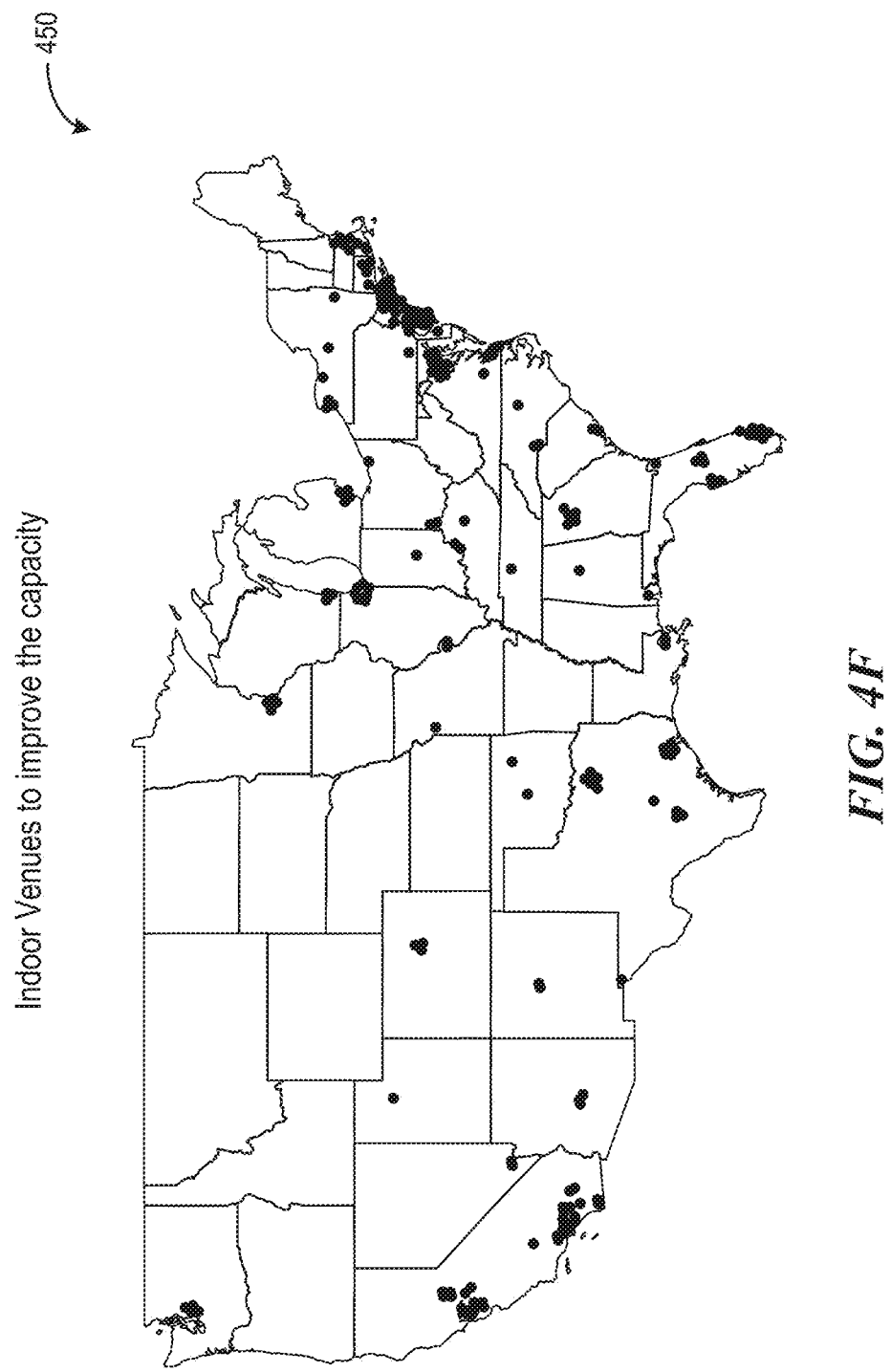

Additionally or alternatively, the customer experience improvement module 250 can identify indoors congestion in buildings across a wide geographic area (e.g., a state, country, etc.). For example, as illustrated in FIG. 4F, the customer experience improvement module 250 can identify congestion at indoor venues across America and display a map 450 identifying the top n congested venues across the country.

Other use cases or applications include improving inbuilding coverage which thereby improves customer experience at indoor venues such as stadium, airports, shopping malls, museums, university/colleges, libraries, city halls, train stations and other public hotspots.

The customer experience improvement module 250 can select one or more customer experience enhancement actions and rank them according to one or more of the following factors: customer preferences, cost of implementation of action, timeline of implementation of action, customer location, discount offered, cost to deploy, time to deploy, and so on. In some implementations, the customer experience improvement module 250 transmits a list of selected customer experience enhancement actions to the telecommunications service provider so that one or more of the selected actions can be implemented to enhance the overall customer experience.

Flow Diagram

Figure 3:
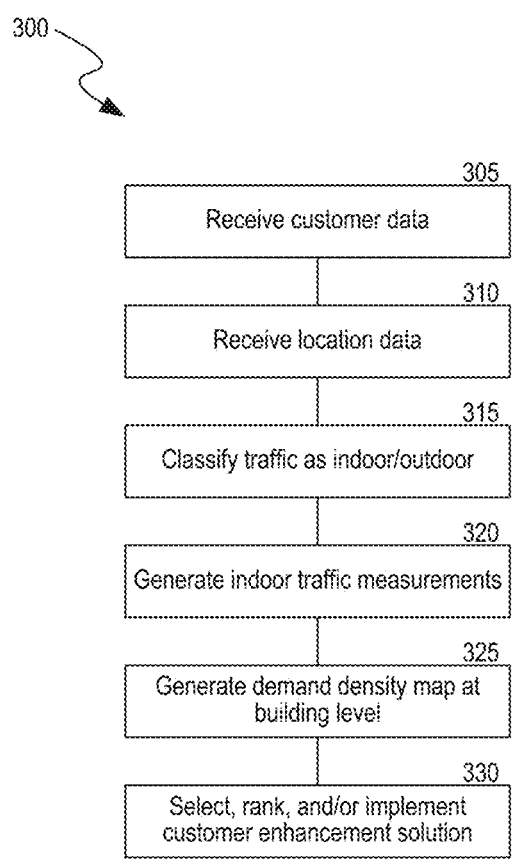
FIG. 3 is a flow diagram illustrating a process of identifying indoor/outdoor telecommunications network traffic.

FIG. 3 is a flow diagram illustrating a process of identifying indoor/outdoor telecommunications network traffic to enhance a customer's experience with a telecommunications service provider. Process 300 begins at block 305 where it receives a set of customer data records (as discussed above in reference to the customer data module 220) and/or a set of network data records (as discussed above in reference to the network data module 230). At block 310, process 300 further receives/accesses/collects a set of location related data records (as discussed above in reference to the location data module 210). Process 300 then proceeds to block 315 where it classifies one or more of the customer and/or network data records as indoors or outdoors traffic measurements (as discussed above in reference to the location data module and the location-based congestion identification module). At block 320, process 300 generates measurements for one or more congestion metrics (e.g., at a building level), such as those discussed above in reference to the location-based congestion identification module. Using the generated congestion metric values, at block 325, process 300 generates one or more demand density maps at a building level for buildings in a geographic portion. After identifying indoors network congestion (e.g., building-level congestion), at block 330, process 300 can identify, select, and/or rank customer experience enhancement actions to be implemented at one or more congested buildings, sites associated with the congested buildings, in the vicinity of the congested buildings, and so on.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative implementations can perform routines having blocks, or employ systems having blocks, in a different order, and some processes or blocks can be deleted, moved, added, subdivided, combined, and/or modified to provide alternative or subcombinations. Each of these processes, message/data flows, or blocks can be implemented in a variety of different ways. Also, while processes or blocks are at times shown as being performed in series, these processes or blocks can instead be performed in parallel, or can be performed at different times. Further, any specific numbers noted herein are only examples: alternative implementations can employ differing values or ranges.

The teachings of the methods and system provided herein can be applied to other systems, not necessarily the system described above. The elements, blocks and acts of the various implementations described above can be combined to provide further implementations.

Any patents and applications and other references noted above, including any that can be listed in accompanying filing papers, are incorporated herein by reference. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the invention can be practiced in many ways. Details of the system can vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as implemented in a computer-readable medium, other aspects can likewise be implemented in a computer-readable medium. Accordingly, the inventors reserve the right to add additional claims after filing the application to pursue such additional claim forms for other aspects of the technology.

The invention claimed is:

1. A computer-implemented method for determining indoor traffic usage for users of a wireless telecommunications service network, the method comprising:
   receiving customer traffic data records comprising information about user locations and at least one of: wireless traffic data at the user locations, upload speed data at the user locations, download speed data at the user locations, wireless data throughput at the user locations, or received signal power at the user locations;
   accessing geospatial information corresponding to a geographic area;
   for at least a subset of the received customer traffic data records, classifying each record as an indoor traffic record or an outdoor traffic record using the received customer traffic data records and the accessed geospatial information;
   generating at least one demand density map for a set of buildings in the geographic area, wherein the at least one demand density map depicts network traffic usage patterns for each building in the set of buildings;
evaluating telecommunications network coverage for each building in the set of buildings; and
based on the evaluation, identifying at least one customer experience enhancement action capable of being deployed at a building in the set of buildings to improve customer usage of services provided via the wireless telecommunications service network.

2. The computer-implemented method of claim 1, wherein the at least one customer experience enhancement action is further identified to meet a particular coverage service level.

3. The computer-implemented method of claim 1, wherein generating the at least one demand density map further accounts for at least one of the following parameters:
type of building,
thickness of walls of building,
number of floors of building,
building dimensions,
signal attenuation,
proximate user location in building,
or any combination thereof.

4. The computer-implemented method of claim 1, wherein the at least one customer experience enhancement action comprises:
adding spectrum to a telecommunication site,
removing spectrum from a telecommunication site,
adding cell site proximate to a telecommunication site,
removing cell site proximate to a telecommunication site,
displacing cell site proximate to a telecommunication site,
adding or enhancing at least one technology capability for a telecommunication site,
cell split,
small cell deployment,
sector addition,
sector removal,
sector capacity enhancement,
cell on wheels addition,
cell on wheel removal,
tower addition,
tower removal,
hot spots addition,
hot spots removal,
capacity modification at a telecommunication site,
or any combination thereof.

5. The computer-implemented method of claim 1, wherein the set of customer traffic data records comprises data generated by one or more applications executing on a mobile device of a customer, and wherein the one or more applications include a media streaming application, a social media application, or an email or SMS/MMS application.

6. The computer-implemented method of claim 1, wherein the set of customer traffic data records comprises:
location specific records (LSR),
call data records (CDRs),
timing advance values,
RF signals,
distance between the customer and at least one telecommunications network site,
strength of signal received by at least one device of the customer,
quantity of data used by the at least one device of the customer,
type of the at least one device of the customer,
or any combination thereof.

7. An apparatus for use with a wireless telecommunications service network, the apparatus comprising:
at least one data processor;
at least one communications module coupled to the at least one processor and to the wireless telecommunications service network; and
at least one memory, communicatively coupled to the at least one processor, and storing instructions to be executed by the at least one processor, the instructions comprising:
receiving customer traffic data records comprising information about user locations and at least one of: traffic data, upload data, download data, throughput, or signal power;
accessing geospatial information corresponding to a geographic area;
for at least a subset of the received customer traffic data records, classifying each record as an indoor traffic record or an outdoor traffic record using the received customer traffic data records and the accessed geospatial information; and
generating at least one demand density map for a set of buildings in the geographic area,
wherein the at least one demand density map depicts network traffic usage patterns for each building in the set of buildings.

8. The apparatus of claim 7, wherein the instructions further comprise:
evaluating telecommunications network coverage for each building in the set of buildings; and
based on the evaluation, identifying at least one customer experience enhancement action capable of being deployed at a building in the set of buildings.

9. The apparatus method of claim 8, wherein the at least one customer experience enhancement action is further identified to meet a particular coverage service level.

10. The apparatus of claim 7, wherein generating the at least one demand density map further accounts for at least one of the following parameters:
type of building,
thickness of walls of building,
number of floors of building,
building dimensions,
signal attenuation,
proximate user location in building,
or any combination thereof.

11. The apparatus of claim 7, wherein the at least one customer experience enhancement action comprises:
adding spectrum to a telecommunication site,
removing spectrum from a telecommunication site,
adding cell site proximate to a telecommunication site,
removing cell site proximate to a telecommunication site,
displacing cell site proximate to a telecommunication site,
adding or enhancing at least one technology capability for a telecommunication site,
cell split,
small cell deployment,
sector addition,
sector removal,
sector capacity enhancement,
cell on wheels addition,
cell on wheel removal,
tower addition,
tower removal,
hot spots addition, hot spots removal,
capacity modification at a telecommunication site,
or any combination thereof.

12. The apparatus of claim 7, wherein the set of customer traffic data records comprises data generated by one or more applications executing on a mobile device of a customer, and wherein the one or more applications include a media streaming application, a social media application, or an email or SMS/MMS application.

13. The apparatus of claim 7, wherein the set of customer traffic data records comprises:
    location specific records (LSR),
    call data records (CDRs),
    timing advance values,
    RF signals,
    distance between the customer and at least one telecommunications network site,
    strength of signal received by at least one device of the customer,
    quantity of data used by the at least one device of the customer,
    type of the at least one device of the customer,
    or any combination thereof.

14. At least one computer-readable medium, carrying instructions, that when executed by at least one data processing platform, determine indoor traffic usage for users of a wireless telecommunications service network, the instructions comprising:
    receiving customer traffic data records comprising information about user locations and at least one of: wireless traffic data at the user locations, upload speed data at the user locations, download speed data at the user locations, wireless data throughput at the user locations, or received signal power at the user locations;
    accessing geospatial information corresponding to a geographic area;
    for at least a subset of the received customer traffic data records, classifying each record as an indoor traffic record or an outdoor traffic record using the received customer traffic data records and the accessed geospatial information; and
    generating at least one demand density map for a set of buildings in the geographic area,
        wherein the at least one demand density map depicts network traffic usage patterns for each building in the set of buildings;
    evaluating telecommunications network coverage for each building in the set of buildings; and
    based on the evaluation, identifying at least one customer experience enhancement action capable of being deployed at a building in the set of buildings to improve customer usage of services provided via the wireless telecommunications service network.

15. The computer-readable medium of claim 14, wherein the at least one customer experience enhancement action is further identified to meet a particular coverage service level.

16. The computer-readable medium of claim 14, wherein generating the at least one demand density map further accounts for at least one of the following parameters:
    type of building,
    thickness of walls of building,
    number of floors of building,
    building dimensions,
    signal attenuation,
    proximate user location in building,
    or any combination thereof.

17. The computer-readable medium of claim 14, wherein the at least one customer experience enhancement action comprises:
    adding spectrum to a telecommunication site,
    removing spectrum from a telecommunication site,
    adding cell site proximate to a telecommunication site,
    removing cell site proximate to a telecommunication site,
    displacing cell site proximate to a telecommunication site,
    adding or enhancing at least one technology capability for a telecommunication site,
    cell split,
    small cell deployment,
    sector addition,
    sector removal,
    sector capacity enhancement,
    cell on wheels addition,
    cell on wheel removal,
    tower addition,
    tower removal,
    hot spots addition,
    hot spots removal,
    capacity modification at a telecommunication site,
    or any combination thereof.

18. The computer-readable medium of claim 14, wherein the set of customer traffic data records comprises data generated by one or more applications executing on a mobile device of a customer, and wherein the one or more applications include a media streaming application, a social media application, or an email or SMS/MMS application.

19. The computer-readable medium of claim 14, wherein the set of customer traffic data records comprises:
    location specific records (LSR),
    call data records (CDRs),
    timing advance values,
    RF signals,
    distance between the customer and at least one telecommunications network site,
    strength of signal received by at least one device of the customer,
    quantity of data used by the at least one device of the customer,
    type of the at least one device of the customer,
    or any combination thereof.

* * * * *